| (12) | United States Patent | (10) Patent No.: | US 8,904,669 B2 |
|---|---|---|---|
| | Tichborne et al. | (45) Date of Patent: | Dec. 9, 2014 |

(54) FUEL SYSTEM AND METHOD

(75) Inventors: Franklin Tichborne, Bristol (GB); Joseph K-W Lam, Bristol (GB); David Parmenter, Uckfield (GB); Simon Masters, Bristol (GB)

(73) Assignee: Airbus Operations Limited, Bristol (GB)

( * ) Notice: Subject to any disclaimer, the term of this patent is extended or adjusted under 35 U.S.C. 154(b) by 222 days.

(21) Appl. No.: 13/634,449

(22) PCT Filed: Mar. 17, 2011

(86) PCT No.: PCT/GB2011/050535
§ 371 (c)(1),
(2), (4) Date: Sep. 12, 2012

(87) PCT Pub. No.: WO2011/117610
PCT Pub. Date: Sep. 29, 2011

(65) Prior Publication Data
US 2013/0000142 A1    Jan. 3, 2013

(30) Foreign Application Priority Data

Mar. 23, 2010   (GB) .................................. 1004837.9

(51) Int. Cl.
| *F26B 21/08* | (2006.01) |
| *B64D 37/34* | (2006.01) |
| *B64D 37/32* | (2006.01) |
| *B01D 53/26* | (2006.01) |
| *B01D 53/86* | (2006.01) |

(52) U.S. Cl.
CPC .............. *B01D 53/265* (2013.01); *B64D 37/34* (2013.01); *B64D 37/32* (2013.01); *Y02T 50/44* (2013.01); *B01D 2257/104* (2013.01); *B01D 2259/4575* (2013.01); *B01D 53/8671* (2013.01); *B01D 2259/4516* (2013.01)

USPC ... 34/443; 34/72; 34/104; 702/25; 73/114.38; 73/31.01; 95/183

(58) Field of Classification Search
USPC ........... 34/380, 381, 413, 443, 60, 72, 80, 90, 34/104; 702/25; 73/31.01, 114.38; 95/183
See application file for complete search history.

(56) References Cited

U.S. PATENT DOCUMENTS 2,976,950 A  *  3/1961  Smith .............................. 95/117
3,776,283 A  *  12/1973  Kramer et al. .................. 141/45

(Continued)

FOREIGN PATENT DOCUMENTS

| DE | 1442896 | * | 2/1969 |
| EP | 1 762 487 A2 | | 3/2007 |

(Continued)

OTHER PUBLICATIONS

International Search Report and Written Opinion for PCT/GB2011/050535 mailed Jun. 22, 2011.

(Continued)

*Primary Examiner* — Steve M Gravini
(74) *Attorney, Agent, or Firm* — Lowe Hauptman & Ham, LLP

(57) ABSTRACT

A fuel system comprising a fuel tank, a vent tank having a duct open to the ambient atmosphere, a first vent line fluidically connecting the fuel tank ullage to the vent tank, a gas drying system including a pump and a dehumidifying device disposed within the vent tank, and a second vent line fluidically connecting a dry gas outlet of the dehumidifying device to the ullage, wherein the pump is operable to maintain a higher pressure within the ullage than in the vent tank so as to drive vapor rich gas from the ullage into the vent tank via the first vent line. Also, a method of operating the fuel system and a method of retro-fitting the gas drying system in an existing fuel system. The gas drying system may optionally be a gas drying/inerting system.

19 Claims, 2 Drawing Sheets

(56) References Cited

U.S. PATENT DOCUMENTS

| | | | | |
|---|---|---|---|---|
| 4,968,332 | A * | 11/1990 | Maher | 96/183 |
| 5,058,693 | A * | 10/1991 | Murdock et al. | 180/69.4 |
| 5,168,709 | A * | 12/1992 | Bombard | 62/48.1 |
| 5,464,466 | A * | 11/1995 | Nanaji et al. | 95/45 |
| 5,575,832 | A * | 11/1996 | Boyd | 95/91 |
| 5,655,732 | A * | 8/1997 | Frank | 244/1 R |
| 6,126,724 | A * | 10/2000 | Martin et al. | 96/4 |
| 6,432,169 | B1 * | 8/2002 | Kluwe et al. | 95/52 |
| 2008/0128048 | A1 | 6/2008 | Johnson et al. | |
| 2013/0000142 | A1 * | 1/2013 | Tichborne et al. | 34/443 |

FOREIGN PATENT DOCUMENTS

| | | | |
|---|---|---|---|
| GB | 1 395 691 A | | 5/1975 |
| GB | 2176840 A | * | 1/1987 |
| GB | 2 442 309 A | | 4/2008 |
| JP | 08049613 A | * | 2/1996 |
| WO | 2007/008730 A2 | | 1/2007 |
| WO | 2009/091632 A1 | | 7/2009 |
| WO | WO 2011117610 A1 | * | 9/2011 |

OTHER PUBLICATIONS

UK Search Report for Application No. 1004837.9 mailed Jul. 22, 2010.

* cited by examiner

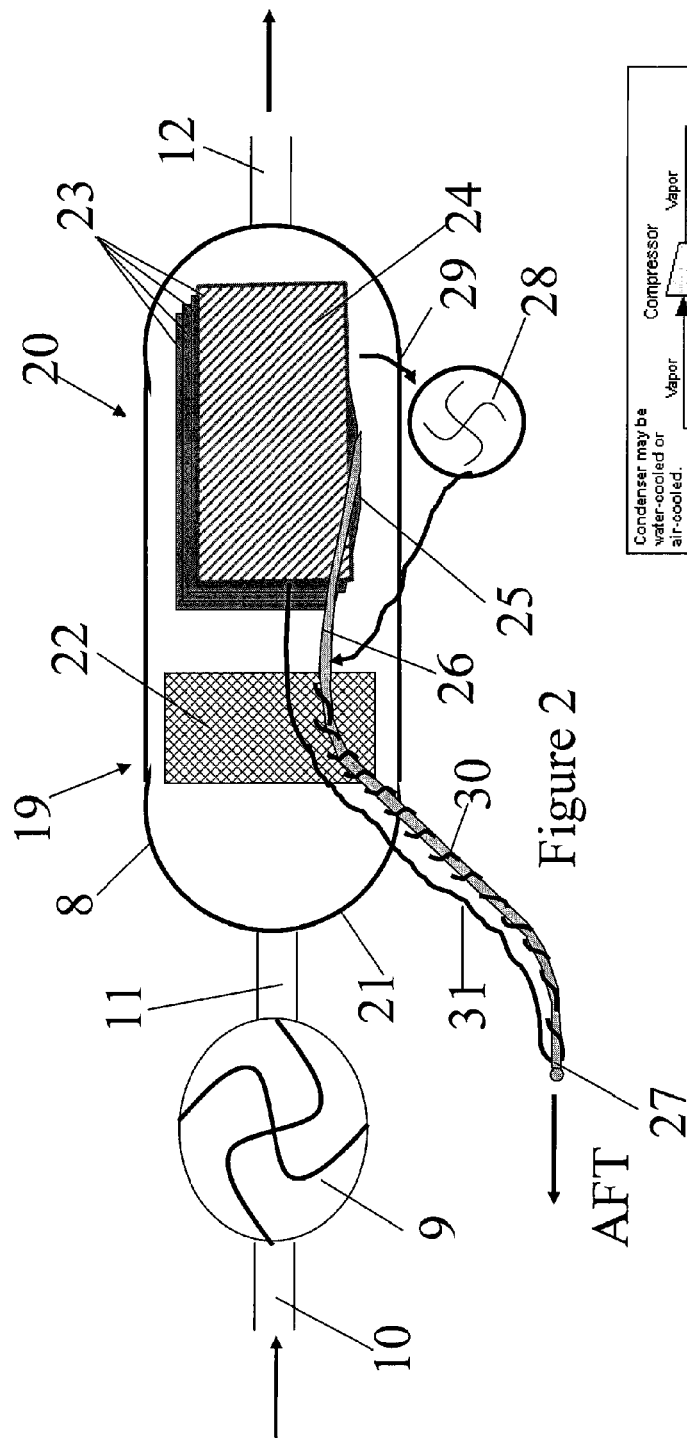
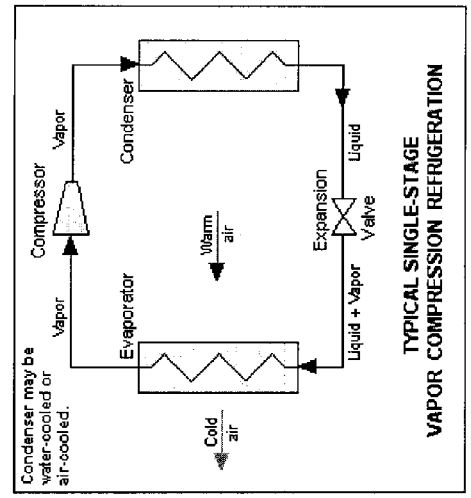
Figure 2
Figure 3

FUEL SYSTEM AND METHOD

RELATED APPLICATIONS

The present application is a National Phase of PCT/GB2011/050535, filed Mar. 17, 2011 and is based on, and claims priority from, Great Britain Application Number 1004837.9, filed Mar. 23, 2010.

FIELD OF THE INVENTION

The present invention relates to a fuel system and to a method of operating the fuel system.

BACKGROUND OF THE INVENTION

Water is an unavoidable contaminant in fuel. It can affect fuel system component reliability and lead to operational delays and increased maintenance activities. In addition, the propensity for microbiological contamination is directly proportional to the presence of water and the temperature within fuel tanks. Sources of water in fuel tanks is from fuel loaded into the fuel tank during refuel (dissolved water) and from air entering the fuel tank via its ventilation system.

Most existing solutions for water management in fuel tanks involve either scavenging water in the liquid phase within the fuel tank, or processing ingress moist air entering the fuel tank via the ventilation system.

SUMMARY OF THE INVENTION

A first aspect of the invention provides a fuel system comprising a fuel tank, a vent tank having a duct open to the ambient atmosphere, a first vent line fluidically connecting the fuel tank ullage to the vent tank, a gas drying system including a pump and a dehumidifying device disposed within the vent tank, and a second vent line fluidically connecting a dry gas outlet of the dehumidifying device to the ullage, wherein the pump is operable to maintain a higher pressure within the ullage than in the vent tank so as to drive vapour rich gas from the ullage into the vent tank via the first vent line.

A second aspect of the invention provides a method for removing water from a fuel system, the fuel system comprising a fuel tank, a vent tank having a duct open to the ambient atmosphere, a first vent line fluidically connecting the fuel tank ullage to the vent tank, a drying system including a pump and a dehumidifying device disposed within the vent tank, and a second vent line fluidically connecting a dry gas outlet of the dehumidifying device to the ullage; the method comprising operating the pump to provide a higher pressure within the ullage than in the vent tank so as to drive vapour rich gas from the ullage into the vent tank via the first vent line.

A third aspect of the invention provides a method of retrofitting a gas drying system in a fuel system, the fuel system comprising a fuel tank, a vent tank having a duct open to the ambient atmosphere, a first vent line fluidically connecting the fuel tank ullage to the vent tank, and a second vent line fluidically connecting the vent tank to the ullage; the method comprising installing a gas drying system comprising a pump and a dehumidifying device within the vent tank, and connecting a dry outlet of the dehumidifying device to an inlet of the second vent line on the vent tank side.

The volume of gas above the liquid fuel within the fuel tank is known as the ullage. The invention is advantageous in that water in the vapour phase within the ullage, and also within the vent tank, is fed to the gas drying system and dry gas is returned to the ullage. The gas drying system forms a partially closed loop so as to maintain a low level of humidity within the ullage. The loop is necessarily partially open due to the vent tank duct, which is open to the ambient atmosphere for pressure equalisation. Ingress moist ambient air into the vent tank via the duct will be processed by the gas drying system before being fed to the ullage. Accordingly, the gas drying system beneficially processes the ullage gas as well as ingress air to maintain a low level of humidity within the ullage. Reducing the ullage humidity reduces the dissolved water content of fuel in the fuel tank by inhibiting condensation of water vapour onto surfaces in the fuel tank and promoting evaporation of dissolved water from the fuel into the ullage atmosphere by natural humidity equalization. The higher pressure within the ullage than in the vent tank is sufficient to ensure that when there is a pressure differential between the ullage and the ambient atmosphere, ingress air passing through the duct and into the vent tank is processed by the gas drying system and is not fed directly into the ullage. In this way, moist ingress air is dehumidified before entering the ullage. Maintaining the content of water in the fuel tank at a low level improves fuel system component reliability, reduces maintenance activities, and reduces microbiological contamination.

The ullage can contain reactive components, such as oxygen and/or fuel vapours, which can be a potential fire/explosion hazard. The term "inerting" refers to the process of depleting one or more of these reactive components to reduce this potential hazard. Catalytic inerting systems have been proposed (see, for example, WO 2007/008730) which take oxygen and fuel vapour from the ullage and pass these over a hot catalytic bed to oxidize the fuel vapour and produce Carbon dioxide and water vapour. Carbon dioxide is then fed back to the ullage to provide an inert ullage atmosphere.

In accordance with a preferred embodiment of this invention, the system further comprises a catalyst disposed within the vent tank, wherein the catalyst is adapted to deplete one or more reactive components of the gas in the vent tank by catalytic reaction. The reactive components may include oxygen and/or fuel vapour. Since the ingress air is inerted at source, i.e. at the vent tank, the inert ullage atmosphere can be maintained even when there is a net inflow of ambient air into the fuel system due to, for example, temperature and/or pressure changes or a change in the fuel level in the tank.

In a particularly preferred implementation, the catalyst is disposed in series between the pump and the dehumidifying device to provide a combined gas drying/inerting system. Since the catalytic reaction for the oxidization of fuel vapour produces waste water vapour, this can be processed by the dehumidifying device immediately downstream of the catalyst within the combined gas drying/inerting system. Not only is the waste water vapour from the catalytic reaction contained, thereby avoiding the need to recapture the water vapour, but a compact combined system can be realized.

The catalytic reaction will proceed when the catalyst has a sufficient supply of reactants and is at its operating temperature. Since the catalyst is disposed in a partially closed loop, the oxygen content of the gas brought into contact with the catalyst will reduce to a low level in a short time. The rate of catalytic reaction will therefore slow, and may stop, but can restart when the oxygen level starts to rise due, for example, to ingress ambient air into the vent tank via the duct. A heat source may be required for heating the catalyst to initiate the catalytic reaction at start-up. The catalytic reaction can generate sufficient heat at the catalyst to sustain itself thereafter.

The catalytic reaction can be shut down quickly, if required, by starving the catalyst of reactants. For example, the pump could be switched off. The rate of the catalytic reaction can be controlled, for example, by varying the rate of gas flow to the catalyst by controlling the pump flow rate.

One or more heat sinks may be used to remove waste heat from the catalytic reaction. For example, the liquid fuel in the fuel tank may be warmed. A temperature sensor may be provided to monitor the fuel temperature and slow or stop the catalytic reaction if the fuel temperature exceeds a predetermined threshold. The waste water from the dehumidifying device may be warmed by this waste heat, which would provide the additional benefit of preventing ice forming in the waste water. Where the fuel system is employed on a vehicle, the waste heat may additionally or alternatively be transferred into the airflow over the vehicle. In particular, where the vehicle is an aircraft the vent tank will typically be located at the wing tip, which beneficially is where the airflow cooling effect is greatest.

The dehumidifying device may be of a refrigerative type having a refrigerating element in contact with gas flowing through the drying system.

The refrigerating element may include one or more condensing cold plates.

The refrigerating element can be connected in a refrigerating cycle to a compressor. The refrigerating cycle may be a single stage vapour compression cycle, for example. Alternatively, the refrigerating element can be cooled electronically, such as by a Peltier effect device, for example.

The cold plate may have a plurality of ribs on its surface. As water (either from the ingress ambient air or generated by the catalytic reaction) condenses out of the gas flow on the surface of the cold plate through nucleation and growth it beads in grooves between the ribs. The cold plate may be arranged substantially vertically with the ribs inclined with respect to the direction of the in-flowing air. The combined effect of gravity and the gas flow encourages the water beads to flow towards the bottom of the plate. To increase the efficiency of the refrigerative dehumidifying device, the cold plate may be one of an array of similar cold plates. These may be arranged side by side to allow the gas flow to pass between adjacent plates.

Water from the refrigerative dehumidifying device may be collected in a sump. In a preferred embodiment, the sump is disposed beneath an array of vertically arranged cold plates. The location and shape of the sump can be tailored according to the refrigerating element(s) used. The sump may need to be drained and this may be done periodically, e.g. during maintenance activities, but is preferably done continuously whilst the device is operating. For example, waste water condensate from the dehumidifying device may be jettisoned into the ambient atmosphere. A discharge tube may be connected at one end to the sump. Where the fuel system is used on a vehicle, e.g. an aircraft, the other end of the discharge tube may be exposed to airflow over the vehicle. Motion of the vehicle may be used to generate suction within the discharge tube drawing the water out into the ambient atmosphere. This is preferable as no active pumping is required, which reduces power consumption and parts. However, a pump may be used if desired.

A temperature sensor may be provided for monitoring the temperature of the refrigerating element. The rate of cooling the refrigerating element can be increased if the temperature is too high to optimally dehumidify the gas flow. The latent heat of the water condensing on the refrigerating element should keep the element from freezing over. However, if the temperature drops below a predetermined threshold, then cooling of the refrigerating element can be stopped. Some vehicles, particularly aircraft, can be subjected to extreme weather conditions and so it may also be desirable to provide anti-icing measures for the dehumidifying device. For example, the discharge tube may be heated by an additional heating element, such as an electric heater. A suitable heating element may also be used for heating the refrigerating element.

Waste heat from the catalytic reaction may be used to prevent icing of components of the dehumidifying device, e.g. the discharge tube and/or the refrigerating elements.

Where the refrigerating element is cooled by a Peltier effect device, it may be operable to perform a self-defrosting function.

In an alternative implementation, the dehumidifying device may include a porous desiccant material for removing water from the gas flow passing therethrough. The desiccant material may be regenerated by suitable drying means.

The gas drying system may be operable whenever the fuel system is active. The catalyst of the gas inerting system (where provided) may also be operable whenever the fuel system is active, although the catalytic reaction would only occur when the reactive component(s) are in contact with the catalyst.

In a preferred implementation, the fuel system may be on an aircraft. Many aircraft have wing fuel tanks with a vent tank, or surge tank, at each wing tip. The vent tank typically includes a NACA duct (or scoop) which opens to the ambient atmosphere from the lower wing surface. The vent tank duct is preferably a NACA duct. The vent tank may further include a climb/dive valve of known type. The climb/dive valve typically has a small positive/negative pressure hysteresis and remains shut when the pressure differential across it is within +/− a few psi, e.g. +/−2 psi. This valve may be used to retain an inerted state during periods when the inerting system is inactive, for example overnight due to diurnal temperature variations.

The ability to retro-fit the gas drying system, or the gas drying/inerting system, as appropriate, to an existing fuel system is of particular benefit. Use can be made of existing vent lines in the fuel system, saving installation costs and weight. The pump may be the only moving part in the gas drying system, meaning minimal maintenance requirements. Installing the gas drying system in the vent tank, rather than the fuel tank, improves accessibility. In addition, the fuel volume of the fuel tank is not compromised.

BRIEF DESCRIPTION OF THE DRAWINGS

Embodiments of the invention will now be described with reference to the accompanying drawings, in which:

FIG. 2 illustrates schematically the gas drying/inerting system; and

FIG. 3 illustrates a typical vapour compression cycle.

DETAILED DESCRIPTION OF EMBODIMENT(S)

Figure 1:
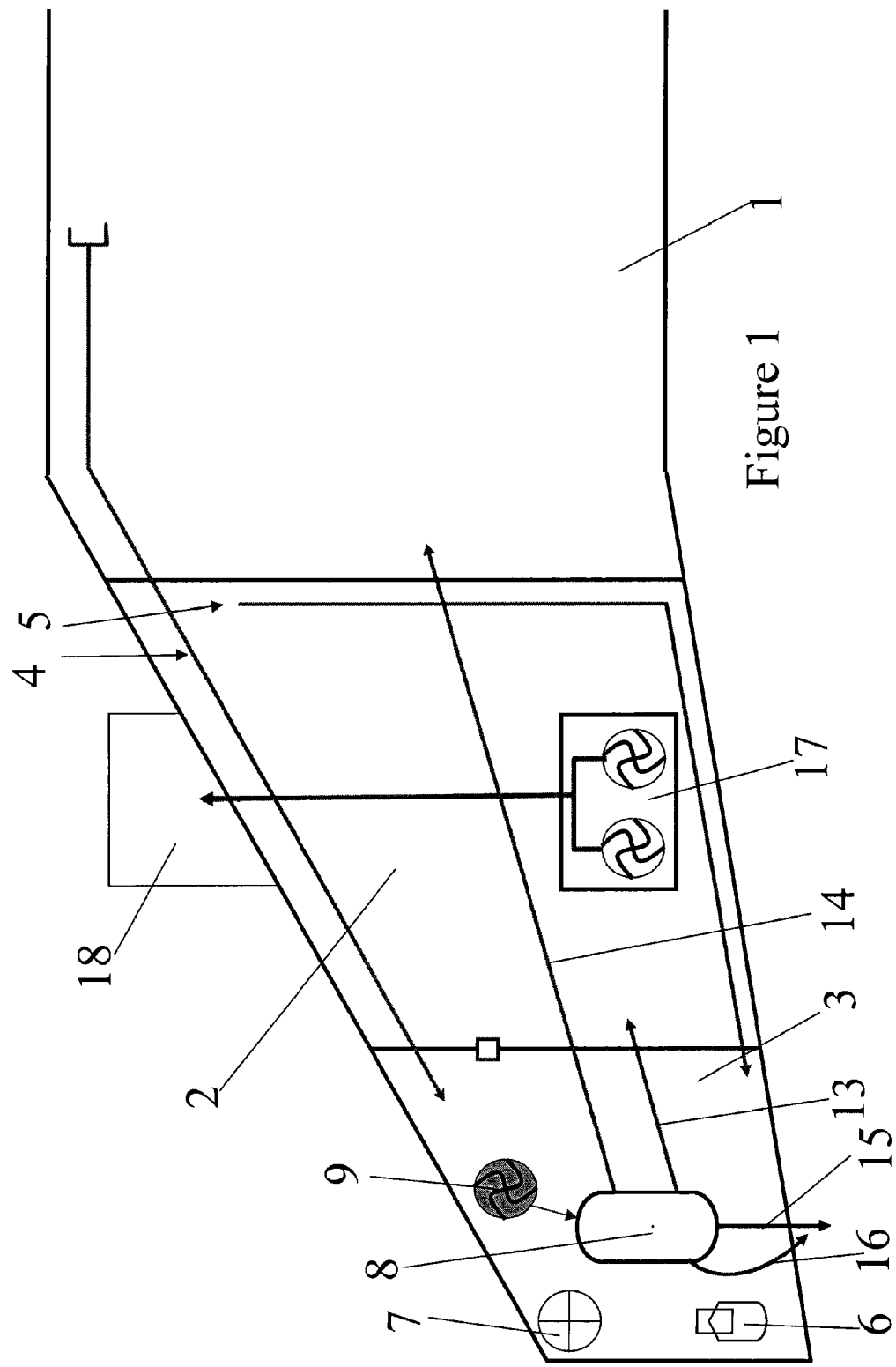
FIG. 1 illustrates schematically an aircraft fuel system including a gas drying/inerting system installed in the wing tip vent tank.

FIG. 1 illustrates schematically the left hand side of an aircraft fuel system having a three-tank configuration. The fuel system includes a centre tank 1, a left wing tank 2 and a right wing tank (not shown). The fuel system includes a ventilation system including a left vent tank 3 and a right vent tank (not shown). The left vent tank 3 ventilates the ullage of the centre tank 1 and the ullage of the left wing tank 2 by means of first vent lines 4, 5. Similarly, although not shown, the ullage of the right vent tank ventilates the right wing tank by a further first vent line.

Each vent tank 3 includes a NACA duct assembly 6 including a NACA vent, or NACA scoop, which opens to the ambient atmosphere on the lower aerodynamic surface of the aircraft wing. The vent tanks 3 further include a climb/dive valve 7 which opens to the ambient atmosphere when a pressure differential between the interior of the vent tank and ambient exceeds a predetermined threshold.

Installed within each vent tank 3 is a gas drying/inerting system 8 having a pump 9. The pump 9 has an inlet 10 open to the interior of the vent tank 3 and is operable to deliver a supply of gas from inside the vent tank 3 to an inlet 11 of the gas drying/inerting system 8. The gas drying/inerting system 8 has an outlet 12 connected to second vent lines 13, 14. The gas drying/inerting system 8 is operable to process the gas flow therethrough and deliver a supply of inert, dry gas to the ullage of the centre and left fuel tanks 1, 2 via second vent lines 13, 14. The pump 9 maintains the fuel tanks 1, 2 at a higher atmospheric pressure than that of the vent tank 3. Waste water and heat is dispensed from the gas drying/inerting system 8 into the airflow over the aircraft as indicated by arrows 15, 16.

The left fuel tank 2 includes fuel pumps 17, which deliver a supply of liquid fuel from the fuel tanks 1, 2 to engine 18.

The gas drying/inerting system 8 is shown in more detail in FIG. 2. Due to the pressure differential between the fuel tanks 1, 2 and the vent tank 3 generated by the pump 9, the ullage atmosphere from the fuel tanks 1, 2 is discharged into the interior of the vent tank 3. The ullage atmosphere typically contains some water vapour, fuel vapours and oxygen. The water vapour can condense and contaminate the fuel in the fuel tanks 1, 2. The fuel vapours and oxygen are reactive components, which can be a potential fire/explosion hazard.

The gas drying/inerting system 8 is adapted to reduce the concentration of water vapour, fuel vapours and oxygen in the ullage atmosphere. The gas drying/inerting system 8 is connected in a partially closed loop to the ullage of the fuel tanks 1, 2. Therefore, the ullage atmosphere is recirculated during flight through the gas drying/inerting system 8 to maintain a dry, inert ullage atmosphere. The loop is only partially closed since the vent tank 3 has the NACA duct assembly 6. When there is a net in-flow of air through the duct assembly 6 into the vent tank 3, the in-flowing air will be directed by pump 9 through the gas drying/inerting system 8 to reduce the water vapour and oxygen content of this air before it enters the ullage. When there is a net outflow of air through the duct assembly 6 into the vent tank, the out-flowing air will have originated in the ullage and so will contain a lower fuel vapour concentration due to the re-circulating function of the gas drying/inerting system 8.

The gas drying/inerting system 8 includes a catalytic inerting device 19 and a dehumidifying device 20 disposed with a housing 20. Of course, the catalytic inerting device and a dehumidifying device could be disposed within separate housings.

The catalytic inerting device 19 includes a catalyst matrix 22. The pump 9 directs gas from the interior of the vent tank into contact with the catalyst matrix 22. The catalyst matrix preferably includes one or more noble metals arranged as a porous metal matrix. Other metallic and non-metallic catalyst materials may alternatively be used as will be appreciated by those skilled in the art. Oxygen and fuel vapour in the gas that comes into contact with the catalyst 22 are combusted by catalytic reaction to produce inert Carbon dioxide and water vapour. The catalyst 22 has to be heated to be effective. The heat of combustion may be sufficient to maintain the catalyst 22 at its operating temperature. However, at start up, an "initiator" heating element (not shown) may be required. The heating element may be positioned adjacent the catalyst 22. A catalytic temperature below 200 degrees Celsius is preferable as this is the interface temperature safety limit permitted at aircraft fuel tank walls. Most preferably, the catalytic temperature is less than 190 degrees Celsius to maintain a margin. Once the catalyst has reached operating temperature from start up, the initiator may be switched off.

An unwanted bi-product of the catalytic reaction is water, which is detrimental to fuel systems. The dehumidifying device 20 acts to remove water vapour from the gas flowing through the housing 21 towards the fuel tank ullage. Beneficially, the dehumidifying device 20 removes water vapour which is generated by the catalytic reaction and also that which enters the vent tank 3 from the ambient atmosphere via the NACA duct assembly 6. In this way, the gas entering the fuel tank ullage is dry and inert.

The dehumidifying device 20 is of a condensing (or refrigerating) type and includes an array of condensing cold plates 23 disposed within the housing 21. In the direction of gas flowing from the inlet 11 to the outlet 12 of the gas drying/inerting system 8, the catalyst 22 is disposed downstream of the inlet 11 and upstream of the cold plates 23. The cold plates 23 are generally vertically arranged and each has a plurality of ribs 24 formed on the surfaces of the plates 23. The ribs are inclined downwardly with respect to the direction of air flowing from the inlet 11 to the outlet 12. A sump 25 is provided at the bottom of the cold plates 23 for collecting condensate. The sump 25 is connected to one end of a discharge tube 26, which passes from the sump 25 to the NACA duct assembly 6. The other end 27 of the discharge tube 26 opens to the atmosphere just downstream of the NACA duct assembly 6 with the discharge tube outflow generally aligned with the air flow under the aircraft wing during flight.

The condensing cold plates 23 form the evaporator section in a single-stage vapour compression refrigeration cycle, which also includes a compressor 28, and refrigerant conduits 29, 30, 31. The refrigeration cycle will be described in detail later.

The condensing element (cold plates 23) interacts with the humid gas passing through the housing 21. Humid gas passes through the matrix of cold plates 23 with water condensing out and leaving cool, dry, inert gas exhausting from the outlet 12. When the humid gas comes into contact with the cold plates 23, water condenses out from the humid gas onto the cold plates through nucleation and growth. The condensed water then runs down the ribs 24 on the cold plates 23 under gravity and shear of flowing gas. It is collected in the sump 25 at the bottom of the cold plate matrix.

The discharge tube 26 drains the water from the sump 25 by an airflow suction effect. The ambient air flowing over the discharge tube outlet 27 due to the forward motion of the aircraft creates a low pressure at the outlet 27. With the head of water in the sump 25 and a low pressure at the tube outlet 27, water is forced through the discharge tube 26 flowing from the sump 25 to the outlet 27.

FIG. 3 illustrates schematically a typical vapour compression cycle. Essentially, the cycle moves heat from one location (the 'source', 'heat source' or 'evaporator') to another location (the 'sink', 'heat sink' or 'condenser') using mechanical work (by a compressor). It works by exploiting the physical properties of an evaporating and condensing fluid known as a refrigerant. The cold plates 23 serve as the heat source (evaporator) and the discharge tube 26 serves as the heat sink (condenser) in the refrigeration cycle.

Heat is transferred from the humid gas through the cold plates 23 to vaporized refrigerant in refrigerant conduit 29. The compressor 28 delivers the vaporized refrigerant from the heat source (cold plates 23) under high pressure and temperature to the heat sink (discharge tube 26). The cool water in the discharge tube 26 absorbs the heat through the walls of the discharge tube 26 from the vaporized refrigerant passing in refrigerant conduit 30, which is helically wound around the tube 26. The cool water condenses the refrigerant in conduit 30 and itself becomes heated in the process. The liquid refrigerant then enters a throttle valve (not shown in FIG. 2) and, expanding, comes out as a liquid-vapour mixture at a lower temperature and pressure, which passes along refrigerant conduit 31 towards the cold plates 23. It then enters the evaporator (cold plates 23), where the liquid is evaporated by contact with a comparatively warmer space. The vapour then passes along conduit 29 to the compressor 28, and the cycle is repeated.

A positive bonus of using the discharge tube 26 as the condenser in the refrigeration cycle is that it keeps the water from freezing up in the tube 30 and thereby allowing uninterrupted flow of water even at low temperatures.

Provision is made to regulate the cold plate 23 temperature to avoid ice building up on the cold plate surfaces through a simple control. The control may be simply a feedback control. For example, a temperature sensor (not shown) on the cold plate 23 can feed a signal to the compressor 28 controller.

The compressor 28 is switched on whenever the catalytic inerting device 19 is operating and when the cold plate 23 temperature is above 0 degrees Celsius. The rate of cooling the cold plate 23 can be increased if the temperature is too high to optimally dehumidify the air. The latent heat of the water condensing on the cold plate should keep it from freezing over. However, if the temperature drops below a predetermined threshold, then cooling of the cold plate 23 can be stopped.

Since aircraft can be subjected to extreme weather conditions, it may also be desirable to provide anti-icing measures for the dehumidifying device 20. For example, the discharge tube 26 may be heated by an additional heating element, such as an electric heater. A suitable heating element may also be used for heating the cold plate 23. For simplicity, the same heating element may be used for heating the cold plate 23 and the discharge tube 26.

It will be appreciated that the catalytic inerting device 19 is optional, in which case the housing 21 contains only the dehumidifying device 20. In this case, the system is a gas drying system only. The gas drying system operates to dehumidify re-circulating ullage gas, and also to dehumidify ingress humid air in-flowing through the NACA duct assembly 6 before it enters the ullage.

The gas drying system, or the gas drying/inerting system, as appropriate can be retro-fit in the vent tank of an existing aircraft fuel system.

Although the invention has been described above with reference to one or more preferred embodiments, it will be appreciated that various changes or modifications may be made without departing from the scope of the invention as defined in the appended claims.

The invention claimed is:

1. A fuel system comprising a fuel tank, a vent tank having a duct open to the ambient atmosphere, a first vent line fluidically connecting the fuel tank ullage to the vent tank, a gas drying system including a pump and a dehumidifying device disposed within the vent tank, and a second vent line fluidically connecting a dry gas outlet of the dehumidifying device to the ullage, wherein the pump is operable to maintain a higher pressure within the ullage than in the vent tank so as to drive vapour rich gas from the ullage into the vent tank via the first vent line.

2. A system according to claim 1, further comprising a catalyst disposed within the vent tank, wherein the catalyst is adapted to deplete one or more reactive components of the gas in the vent tank by catalytic reaction.

3. A system according to claim 2, wherein the reactive components include oxygen and/or fuel vapour.

4. A system according to claim 2, wherein the catalyst is disposed in series between the pump and the dehumidifying device to provide a combined gas drying/inerting system.

5. A system according to claim 1, wherein the dehumidifying device is of a refrigerative type having a refrigerating element in contact with gas flowing through the drying system.

6. A system according to claim 5, wherein the refrigerating element includes one or more condensing cold plates.

7. A system according to claim 5, wherein the refrigerating element is connected in a refrigeration cycle to a compressor.

8. A system according to claim 5, further comprising a discharge tube adapted to pass condensate from the refrigerating element to the ambient atmosphere.

9. An aircraft including a fuel system according to claim 1.

10. An aircraft according to claim 9, wherein the vent tank further includes a climb/dive valve.

11. A method for removing water from a fuel system, the fuel system comprising a fuel tank, a vent tank having a duct open to the ambient atmosphere, a first vent line fluidically connecting the fuel tank ullage to the vent tank, a drying system including a pump and a dehumidifying device disposed within the vent tank, and a second vent line fluidically connecting a dry gas outlet of the dehumidifying device to the ullage; the method comprising operating the pump to provide a higher pressure within the ullage than in the vent tank so as to drive vapour rich gas from the ullage into the vent tank via the first vent line.

12. A method according to claim 11, wherein the fuel system further comprises a catalyst disposed within the vent tank; the method further comprising bringing the gas in the vent tank into contact with the catalyst and operating the catalyst to deplete one or more reactive components of the gas in the vent tank by catalytic reaction.

13. A method according to claim 12, wherein the reactive components include oxygen and/or fuel vapour.

14. A method according to claim 12, wherein the catalyst is disposed in series between the pump and the dehumidifying device.

15. A method according to claim 12, further comprising heating waste water from the dehumidifying device using waste heat from the catalytic reaction.

16. A method according to claim 12, further comprising controlling the pump according to the temperature of the catalytic reaction, and/or the oxygen content of the gas downstream of the catalyst.

17. A method according to claim 11, further comprising jettisoning waste water from the dehumidifying device into the ambient atmosphere.

18. A method of retro-fitting a gas drying system in a fuel system, the fuel system comprising a fuel tank, a vent tank having a duct open to the ambient atmosphere, a first vent line fluidically connecting the fuel tank ullage to the vent tank, and a second vent line fluidically connecting the vent tank to the ullage; the method comprising installing a gas drying system comprising a pump and a dehumidifying device within the vent tank, and connecting a dry outlet of the dehumidifying device to an inlet of the second vent line on the vent tank side.

19. A method according to claim 18, wherein the gas drying system forms part of a gas drying/inerting system that further comprises a catalyst for depleting one or more reactive components of gas in the vent tank by catalytic reaction.

* * * * *